United States Patent
Van Craaikamp

(10) Patent No.: US 8,506,365 B2
(45) Date of Patent: Aug. 13, 2013

(54) METHOD AND PROCESSING LINE FOR PROCESSING POULTRY

(75) Inventor: Jacob Jan Van Craaikamp, Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 0 days.

(21) Appl. No.: 13/347,909

(22) Filed: Jan. 11, 2012

(65) Prior Publication Data

US 2012/0196519 A1    Aug. 2, 2012

(30) Foreign Application Priority Data

Jan. 27, 2011   (NL) ..................................... 2006081

(51) Int. Cl.
   *A22B 1/00*   (2006.01)
(52) U.S. Cl.
   USPC ........................................................ 452/53
(58) Field of Classification Search
   USPC ................................................ 452/53, 57, 66
   See application file for complete search history.

(56) References Cited

U.S. PATENT DOCUMENTS

| | | | | |
|---|---|---|---|---|
| 5,975,029 | A * | 11/1999 | Morimoto et al. ............. | 119/843 |
| 6,848,987 | B2 * | 2/2005 | Draft ............................... | 452/66 |
| 7,097,552 | B2 * | 8/2006 | Ovesen et al. .................. | 452/66 |
| 7,448,943 | B1 * | 11/2008 | Woodford et al. .............. | 452/66 |
| 7,717,773 | B2 * | 5/2010 | Woodford et al. .............. | 452/66 |
| 7,771,255 | B2 * | 8/2010 | Cattaruzzi ....................... | 452/57 |
| 7,798,890 | B2 * | 9/2010 | Gerrits et al. ................... | 452/53 |
| 7,976,368 | B2 * | 7/2011 | Haucke et al. ................. | 452/184 |
| 8,206,203 | B2 * | 6/2012 | Gerrits et al. ................... | 452/53 |

FOREIGN PATENT DOCUMENTS

| | | |
|---|---|---|
| EP | 1 583 426 | 10/2005 |
| NL | 1 009 189 | 11/1999 |
| WO | WO 02/02444 A1 | 1/2002 |
| WO | WO 02/069722 A1 | 9/2002 |
| WO | WO 2004/057969 | 7/2004 |

OTHER PUBLICATIONS

Search report for NL 2006081, dated Aug. 9, 2011.

* cited by examiner

*Primary Examiner* — Richard Price, Jr.
(74) *Attorney, Agent, or Firm* — Dority & Manning, P.A.

(57) ABSTRACT

Method and processing line for stunning and/or killing of poultry, comprising a plurality of treatment stations to execute the stunning and/or killing of poultry contained in containers or crates, a feed-line for supplying the poultry in containers or crates to the plurality of treatment stations, and an exit line to transport the stunned and/or killed poultry contained in the containers or crates away from the treatment stations, wherein a shuttle unit is provided that is movable on the one part to and from the plurality of treatment stations and on the other part to and from the feedline and the exit line.

15 Claims, 5 Drawing Sheets

METHOD AND PROCESSING LINE FOR PROCESSING POULTRY

FIELD OF THE INVENTION

The subject matter of present disclosure relates to a method and processing line for stunning and/or killing of poultry.

BACKGROUND OF THE INVENTION

Stunning and/or killing of poultry is a matter that is daily practiced in slaughter-houses for poultry. EP-B-1 583 426 for instance teaches a method and device which may be employed in a slaughterhouse to make a stream of living poultry in the slaughter line substantially uniform.

The words 'living poultry' as used in EP-B-1 583 426 are to be understood as meaning poultry which is in the normal state of consciousness, but also poultry which has been stunned in a customary way in the slaughterhouse before, during, or after unloading. Different levels of stunning are possible, and the stunning may be reversible or irreversible.

The words 'living poultry' according to said document are also to be understood as meaning poultry which is still covered with feathers and has not yet been plucked. This means that, according to EP-B-1 583 426, poultry which is irreversibly stunned (or killed) is deemed to qualify as 'living poultry." In the same sense the instant application at least concerns a processing line for living poultry which is, after stunning and/or killing, still covered with feathers and has not yet been plucked.

SUMMARY OF THE INVENTION

Aspects and advantages of the invention will be set forth in part in the following description, or may be obvious from the description, or may be learned through practice of the invention.

In one exemplary embodiment thereof, the present invention can convert a stream of living poultry which is supplied to the slaughterhouse on an irregular basis into a relatively uniform stream of stunned and/or killed poultry. In certain embodiments, the present invention can also reduce the transfer time from delivery of the poultry to the slaughterhouse to a stream of stunned and/or killed poultry. In still other embodiments, the present invention can reduce congestion in the flow of poultry that is supplied to the slaughter house, which poultry is awaiting to be stunned and/or killed. Such aspects and advantages of the present invention can be attained in a process line and/or method with one or more features as described herein and as appears in one or more of the appended claims.

In one exemplary aspect, the present invention includes a plurality of treatment stations to execute the stunning and/or killing of poultry contained in containers or crates, a feed-line for supplying the poultry in containers or crates to the plurality of treatment stations, and an exit line to transport the stunned and/or killed poultry contained in the containers or crates away from the treatment stations. At least one shuttle unit is provided that is movable on the one part to and fro the plurality of treatment stations and on the other part to and fro the feedline and the exit line. Such makes possible that the act of stunning and/or killing of poultry, which is basically a batch type of operation executed on an irregular supply of poultry, can be converted into a basically continuous flow of stunned and/or killed poultry and made available at the exit line. This is highly beneficial for the further processing of this poultry in the slaughterhouse. A further advantage is that this exemplary processing line is less sensitive for interruptions of operation on one of the treatment units.

To promote effective operation, this exemplary processing line can be operated such that the at least one shuttle unit is moved from the feedline to a selected one of the treatment stations for stunning and/or killing the poultry and, after the stunning and/or killing the poultry, the at least one shuttle unit can move the poultry from the selected one of the treatment stations to the exit line.

In still another exemplary aspect, the at least one shuttle unit can be arranged to be movable in a cyclical manner between the plurality of treatment stations and the feedline and exit line respectively. As such, it continuously drops containers or crates with poultry collected from the feedline to one of the empty treatment stations and collects containers or crates with already stunned and/or killed poultry from another one of the treatment stations for supplying them to the exit line. In this manner the stunning and/or killing of the poultry can continue in a batch type operation, whereas the eventual delivery via the exit line of readily stunned and/or killed poultry can be basically continuous.

Depending on the desired capacity of the processing line it can be advantageous that the at least one shuttle unit is arranged to move a stack of containers or crates with poultry.

In an exemplary aspect of the invention, to assure smooth operation, the processing line can be provided with the feature that the at least one shuttle unit is movable in a direction which is transverse to the feedline and/or exit line.

In certain embodiments, the feedline and exit line are lying in each other's extended direction. This provides the advantage that in a situation that the at least one shuttle unit is malfunctioning or in case the treatment units are not operating properly, the poultry can be moved straight on from the feedline to the exit line. In still another embodiment, the at least one shuttle unit is movable back-and-forth along rails. Beneficially then the treatment units are positioned adjacent to the rails.

In case of a high-capacity processing line in which stacks of crates or containers are handled, it is desirable that at the entry of the exit line means are provided for removing the containers or crates one by one from this stack of containers or crates. For swift operation of the processing line of the invention, in certain exemplary embodiments it may be advantageous to employ two shuttle units on the same rails.

The invention will hereinafter be further elucidated with reference to the drawing of two exemplary embodiments of the processing line according to the invention. These exemplary embodiments are not intended to be understood as restricting the scope of protection of the appended claims, but instead providing description of the invention by way of example without compromising the extent of protection of these claims. As such, these above described and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
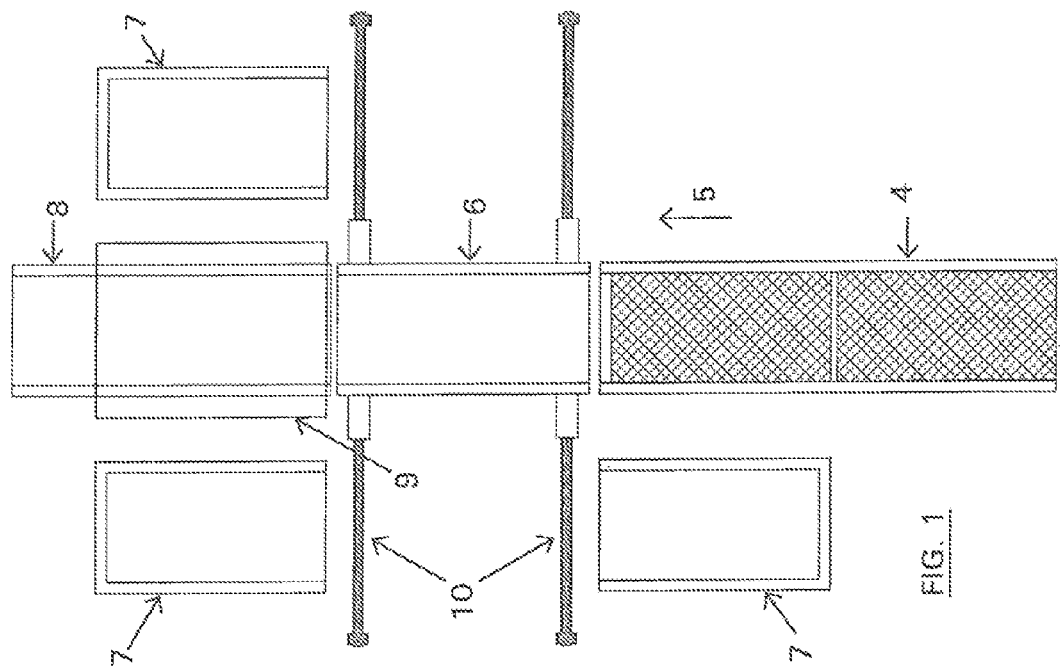
FIG. 1 illustrates an exemplary embodiment of a processing line according to the invention.
Figure 1:
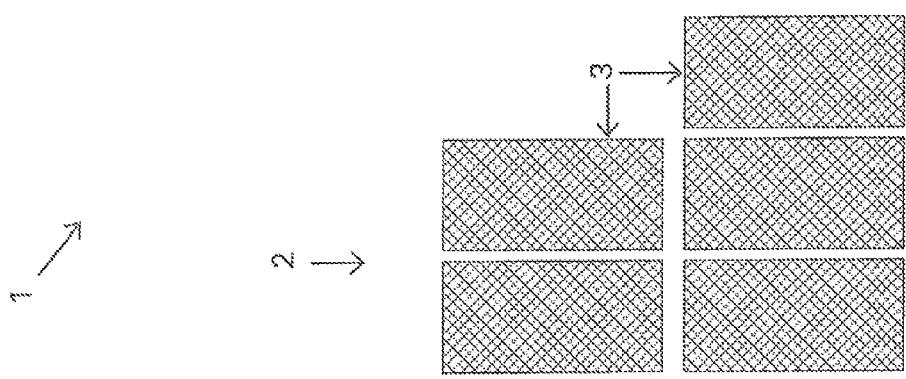
Figure 2:
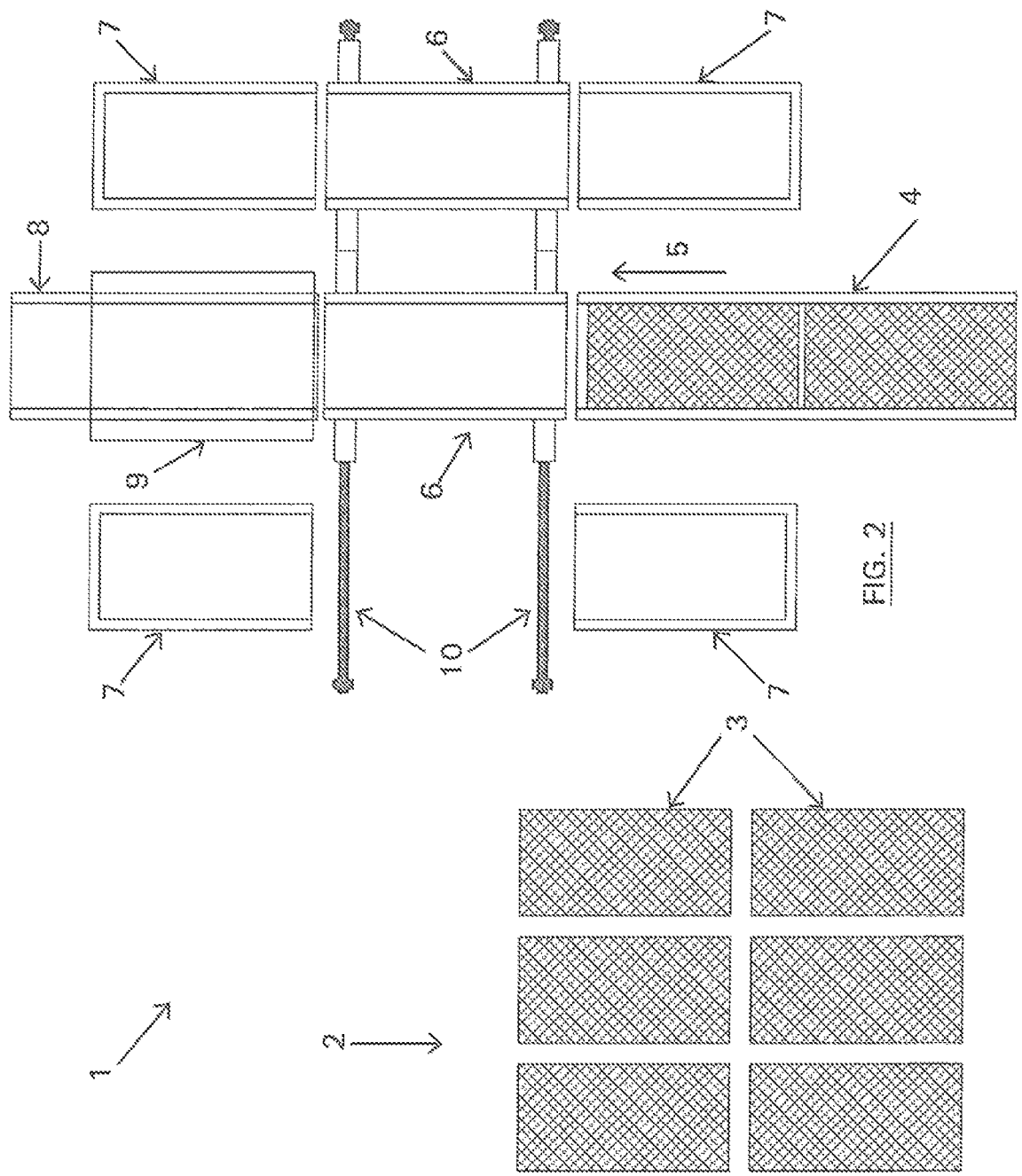
FIG. 2 illustrates another exemplary embodiment of a processing line according to the invention.
Figure 3:
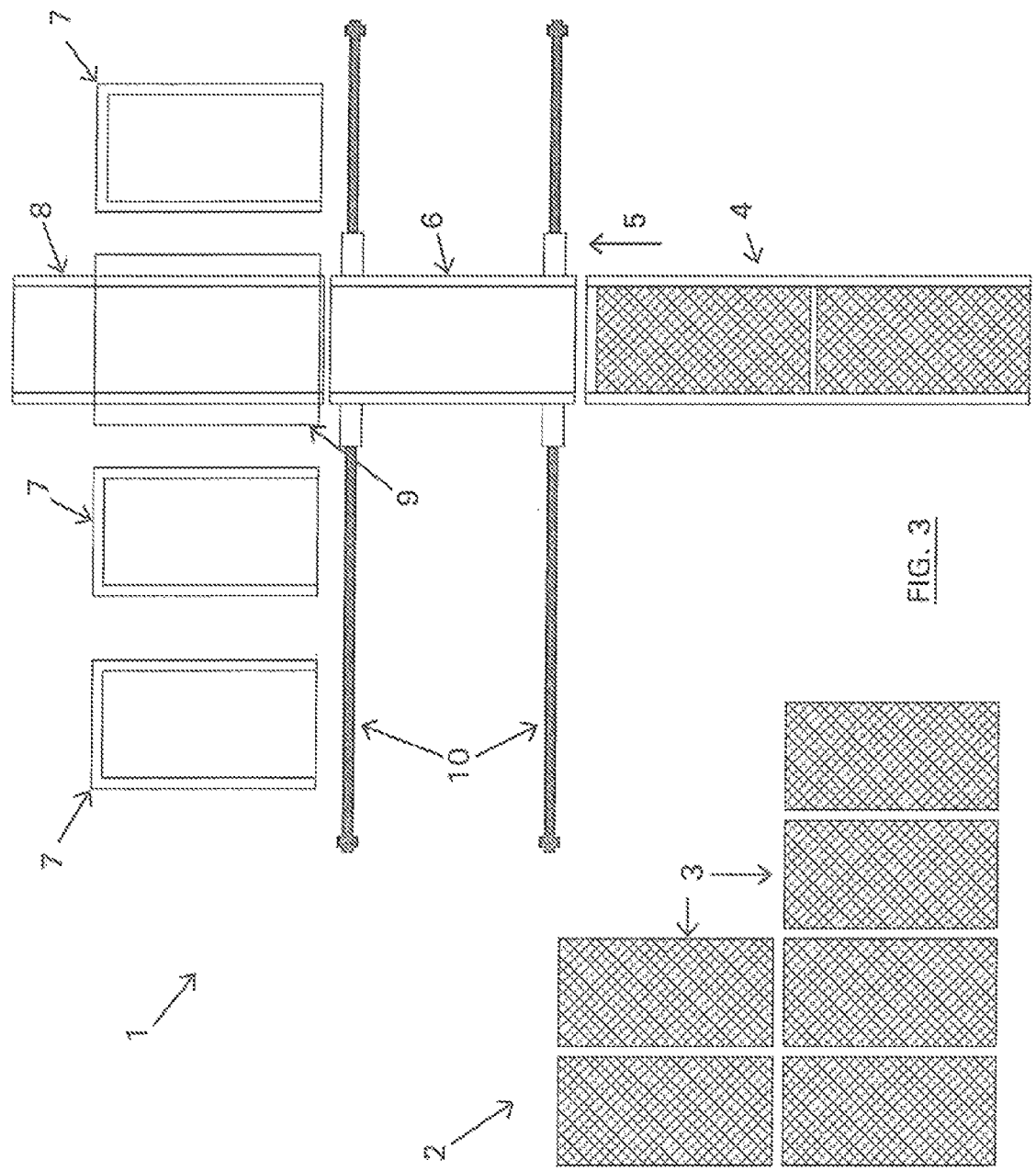
FIG. 3 illustrates another exemplary embodiment of a processing line according to the invention.
Figure 4:
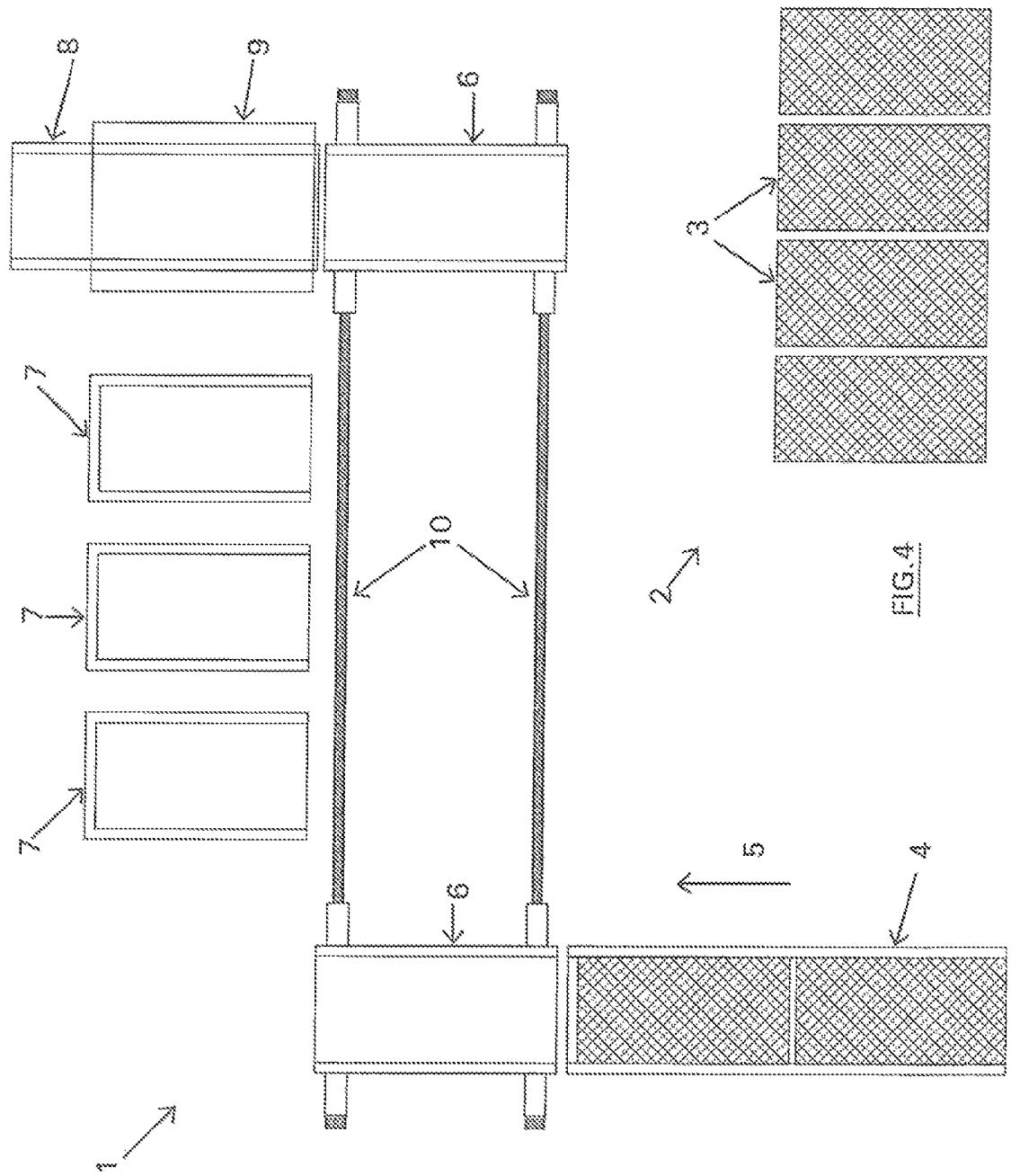
FIG. 4 another exemplary embodiment of a processing line according to the invention.
Figure 5:
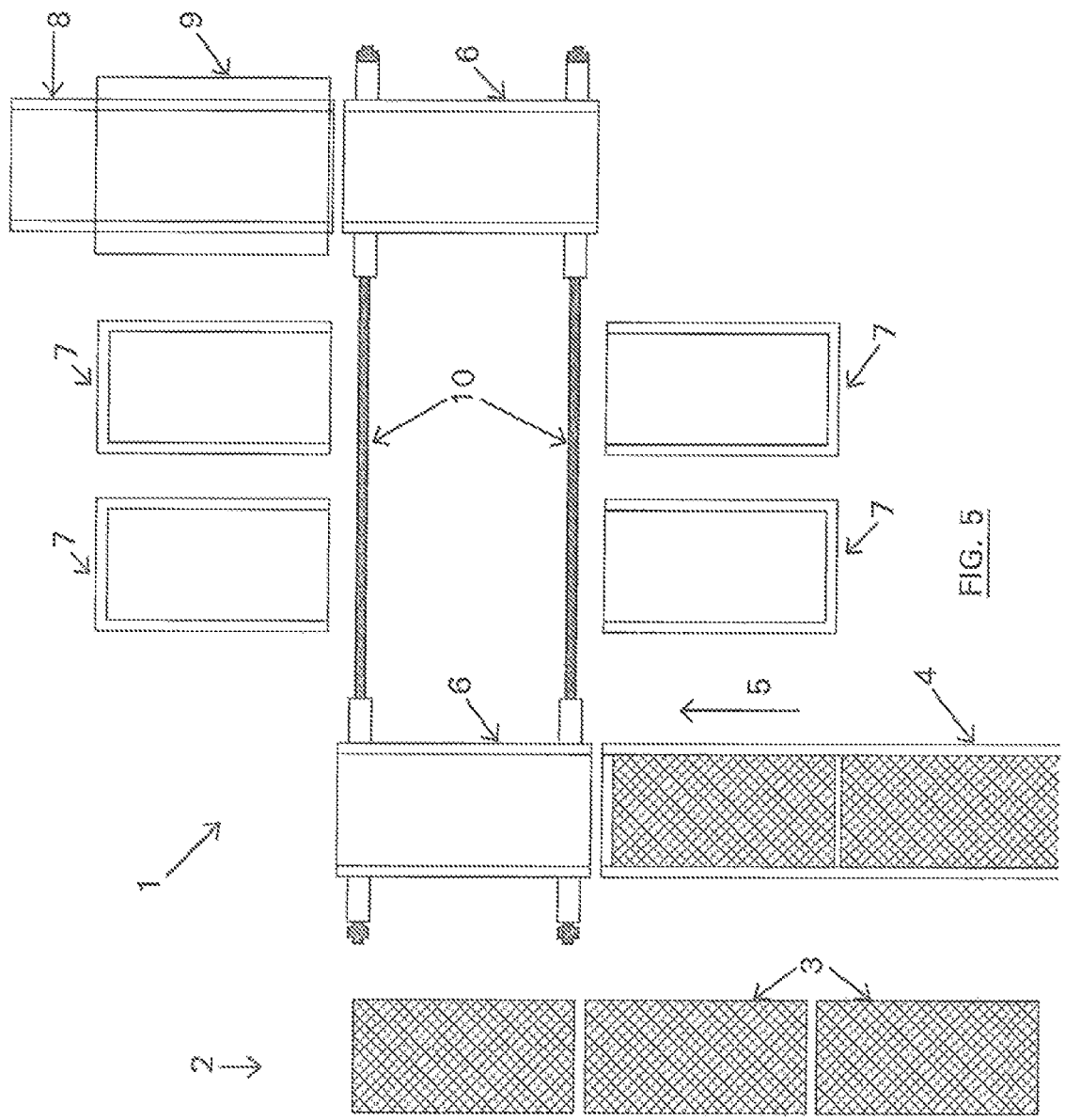
FIG. 5 illustrates another exemplary embodiment of a processing line according to the invention.

The processing line that is shown in the FIGS. 1-5 is generally indicated with reference numeral 1. In area 2, unloading of containers or crates 3 with poultry from a (not shown) truck can be carried out. These containers or crates 3 are subsequently placed on a feedline 4 by which they are moved in the direction of arrow 5 towards a shuttle unit 6 as shown in FIGS. 1 and 3. FIGS. 2, 4 and 5 show the implementation of two shuttle units 6.

After loading the containers or crates 3—maybe in a stack of two, three, four, or any other number of containers or crates—on the shuttle unit(s) 6, the containers or crates 3 are supplied to any one of a series of treatment units 7. At a selected treatment unit 7, the poultry in the containers or crates 3 undergo treatment for their stunning and/or killing. After delivery to one of such treatment units 7, the shuttle unit 6 that is employed therefore is free to return to the feedline 4 for picking up a further container or crate 3 for delivery to a next treatment unit 7, or alternatively, it can pick up a container or crate 3 with poultry that has already been stunned and/or killed in another treatment unit 7 and supply the latter to the exit line 8. Evidently, in case of such delivery to the exit line 8, there are still other treatment units 7 in operation that are completing their stunning and/or killing of the poultry that are supplied to such units, and which may, in case sufficient treatment units 7 are employed, be ready in time to collect therefrom the ready poultry to secure a continuous supply of containers or crates 3 with stunned and/or killed poultry to the exit line 8.

Particularly in case the processing line 1 operates with stacks of containers or crates 3 that are handled by the shuttle unit(s) 6, it is preferable that at the entry of the exit line 8 provision is made for means 9 to remove the containers or crates 3 one by one from such stacks of containers or crates 3.

Considering what has been elucidated here above, it will be clear that to secure an optimal operation of the processing line number 1 it is preferable that the one shuttle unit 6 in FIGS. 1 and 3, and the two shuttle units 6 in FIGS. 2, 4 and 5 is/are arranged to be movable in a cyclical manner between the plurality of treatment stations 7 and the feedline 4 and exit line 8 respectively. In this way it can be arranged that the shuttle unit(s) 7 continuously drops containers or crates 3 with poultry collected from the feedline 4 to one of the empty treatment stations 7, and collects containers or crates 3 with stunned and/or killed poultry from another one of the treatment stations 7 for supplying them to the exit line 8.

With further reference to the FIGS. 1-5 it can be mentioned that the shuttle unit(s) 6 is/are preferably movable in a direction which is transverse to the feedline 4 and/or exit line 8. Further in FIGS. 1-3 a preferred embodiment is shown in which the feedline 4 and exit line 8 are lying in each other's extended direction. This is beneficial in case of maintenance or other reasons for not functioning of either the shuttle unit(s) 6 or the treatment units 7. FIGS. 4 and 5 show an alternative solution wherein the feedline 4 and exit line 8 are lying in a staggered relation with respect to each other.

Further it is remarked that the shuttle unit(s) 6 is/are preferably movable back-and-forth along rails 10, wherein it is also preferable that the treatment units 7 are positioned adjacent to the rails 10.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A method for processing poultry, comprising the steps of providing containers or crates of poultry by a feed-line to a plurality of treatment stations;
   providing at least one shuttle unit that is movable along a direction that is transverse to a direction of movement of the feed-line;
   using at least one shuttle unit to move the containers or crates from the feed line to the plurality of treatment stations;
   executing the stunning, killing, or both of the poultry using the plurality of treatment stations; and,
   employing the at least one shuttle unit to move the containers or crates of poultry from the plurality of treatment stations to an exit line.

2. A method for processing poultry as in claim 1, wherein said step of employing occurs subsequent to said steps of using and executing.

3. A method for processing poultry as in claim 1, wherein the at least one shuttle unit is moved in a cyclical manner between the plurality of treatment stations and the feedline and exit line respectively, such that the at least one shuttle continuously drops containers or crates with poultry collected from the feedline to one of the empty treatment stations, and collects containers or crates with stunned and/or killed poultry from another one of the treatment stations for supplying them to the exit line.

4. A method for processing poultry as in claim 1, wherein the at least one shuttle unit is moved back-and-forth along rails that are arranged transverse to the feedline, the exit line, or both.

5. A method for processing poultry as in claim 1, wherein the feedline and exit line each lie along the same extended direction.

6. A processing line for the treatment of poultry, comprising:
- a feed line for supplying poultry in containers or crates;
- an exit line to transport away poultry in the containers or crates;
- at least one shuttle unit movable along a direction that is transverse to the feed line and that is positioned between the feed line and the exit line, each shuttle unit configured to receive one or more containers or crates from the feed line and configured to deliver one or more container or creates to the exit line;
- a plurality of treatment stations to execute the stunning, killing, or both of poultry contained in containers or crates delivered by the shuttle unit, the treatment stations positioned adjacent to the feed line, the exit line, or both along the transverse direction such that the shuttle is movable between the plurality of treatment stations and movable between the feed line and the exit line, so as to allow for the transport of the containers or crates by the at least one shuttle unit between the feed-line, the plurality of treatment stations, and the exit line.

7. A processing line for the treatment of poultry as in claim 6, wherein the at least one shuttle unit is configured for the transport of the containers or crates with the poultry from the feed-line to a selected one of the plurality of treatments stations, and from the selected one of the plurality of treatment stations to the exit line.

8. A processing line for the treatment of poultry as in claim 6, wherein the at least one shuttle unit is arranged to be movable in a cyclical manner between the plurality of treatment stations and the feed line and the exit line respectively, such that the at least one shuttle unit continuously drops containers or crates with poultry collected from the feed line to an empty one of the treatment stations, and collects containers or crates with stunned and/or killed poultry from another one of the treatment stations for supplying same to the exit line.

9. A processing line for the treatment of poultry as in claim 6, wherein the at least one shuttle unit is arranged to move a stack of the containers or crates with poultry.

10. A processing line for the treatment of poultry as in claim 6, wherein feed lines defines a direction of movement of the containers or crates along the feed-line, and the exit line defines a direction of movement of the containers or crates along the exit line, and wherein the at least one shuttle unit is movable in a direction that is transverse to the direction of movement of the containers or crates along the feed line, the exit line, or both.

11. A processing line for the treatment of poultry as in claim 10, wherein the feed line and the exit line are lying along each other's extended direction.

12. A processing line for the treatment of poultry as in claim 6, wherein the at least one shuttle unit is movable back-and-forth along rails.

13. A processing line for the treatment of poultry as in claim 6, wherein the processing line comprises at least two shuttle units movable back-and-forth along the rails.

14. A processing line for the treatment of poultry as in claim 13, wherein the treatment units are positioned adjacent to the rails.

15. A processing line for the treatment of poultry as in claim 6, further comprising means for removing the containers or crates one by one from a stack of containers or crates.

* * * * *